(12) United States Patent
Son et al.

(10) Patent No.: US 11,718,237 B2
(45) Date of Patent: Aug. 8, 2023

(54) SLIDING TYPE GLOVE BOX

(71) Applicants: KBI DONGKOOK IND. CO., LTD., Seoul (KR); HYUNDAI MOBIS CO., LTD., Seoul (KR)

(72) Inventors: Dong Il Son, Ulsan (KR); Dong Yong Choi, Gyeonggi-do (KR); O Sim Kwon, Ulsan (KR); Tae Yong Eom, Ulsan (KR); Sun Kyung Kim, Ulsan (KR); Chang Bok Park, Ulsan (KR); Sung Ho Kang, Gyeonggi-do (KR)

(73) Assignees: KBI DONGKOOK IND. CO., LTD., Seoul (KR); HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/507,725

(22) Filed: Oct. 21, 2021

(65) Prior Publication Data
US 2022/0153203 A1    May 19, 2022

(30) Foreign Application Priority Data
Nov. 18, 2020    (KR) .................... 10-2020-0154663

(51) Int. Cl.
*B60R 7/06*    (2006.01)
(52) U.S. Cl.
CPC ..................... *B60R 7/06* (2013.01)
(58) Field of Classification Search
CPC ..... B60R 7/06; B60R 7/04; B60R 2011/0007; B60R 2011/005; B60R 2011/0084
USPC ...................................... 296/36.12
See application file for complete search history.

(56) References Cited

U.S. PATENT DOCUMENTS

| | | | | |
|---|---|---|---|---|
| 6,042,168 A | * | 3/2000 | Bieri | B60R 7/06 312/246 |
| 8,246,097 B2 | * | 8/2012 | Beyer | B60R 7/04 224/400 |
| 8,870,255 B2 | * | 10/2014 | Mildner | B60R 7/04 296/37.1 |
| 8,919,852 B2 | * | 12/2014 | Schulz | E05B 83/28 49/423 |
| 9,428,092 B2 | * | 8/2016 | Bosma | B60N 3/102 |
| 9,914,398 B1 | * | 3/2018 | Sanders | B60R 7/06 |
| 11,535,165 B2 | * | 12/2022 | Son | B60R 7/06 |
| 2016/0137137 A1 | * | 5/2016 | Shibata | B60R 7/06 296/37.12 |
| 2019/0135187 A1 | | 5/2019 | Munro et al. | |

(Continued)

FOREIGN PATENT DOCUMENTS

| EP | 3944990 A1 | * | 2/2022 |
|---|---|---|---|
| EP | 3944990 A1 | | 2/2022 |
| KR | 100350274 B1 | | 8/2002 |

(Continued)

*Primary Examiner* — Pinel E Romain
(74) *Attorney, Agent, or Firm* — Hauptman Ham, LLP

(57) ABSTRACT

A sliding type glove box is proposed. The sliding type glove box includes a housing mounted to a dashboard, a plurality of rails provided inside the housing, and a storage part configured to be ejected in a sliding manner while being moved along the rails, wherein the rails include: outer rails mounted to the housing; and inner rails configured to be movable along the outer rails and connected to a lower portion of the storage part, wherein each of the outer rails has a stopper removably provided thereon to limit a moving distance of the storage part.

5 Claims, 4 Drawing Sheets

(56) References Cited

U.S. PATENT DOCUMENTS

2020/0130594 A1\*  4/2020  Park .......................... B60R 7/06
2022/0153202 A1\*  5/2022  Beyersdorfer ............ B60R 7/06

FOREIGN PATENT DOCUMENTS

| KR | 100693937 B1 | 3/2007 | | |
| KR | 100868151 B1 | 11/2008 | | |
| KR | 1020140113417 A | 9/2014 | | |
| KR | 2082171 B1 \* | 2/2020 | ............... | B60R 7/06 |
| KR | 102082171 B1 | 2/2020 | | |
| WO | WO-2020058143 A1 \* | 3/2020 | ............. | B60N 2/753 |

\* cited by examiner

[FIG. 1]
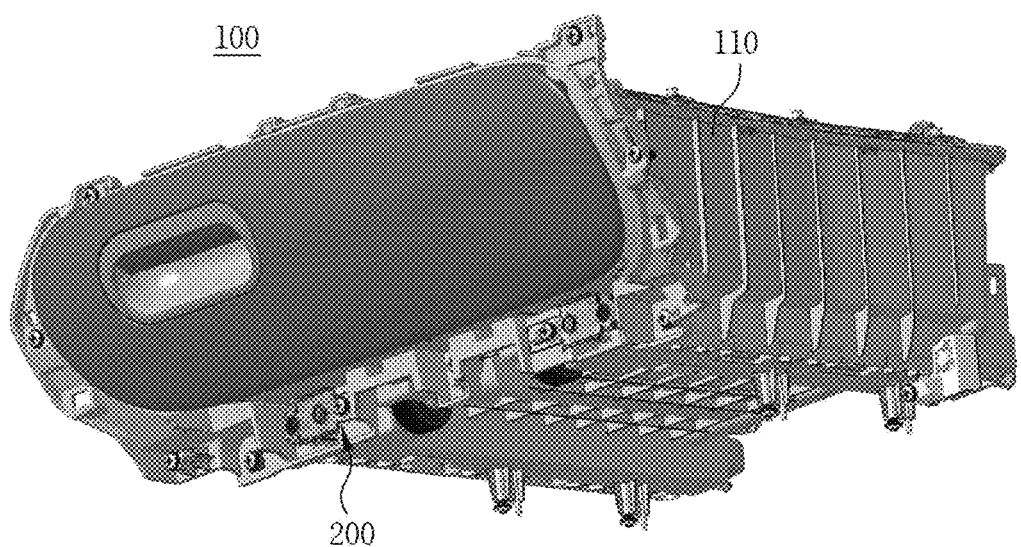
[FIG. 2]
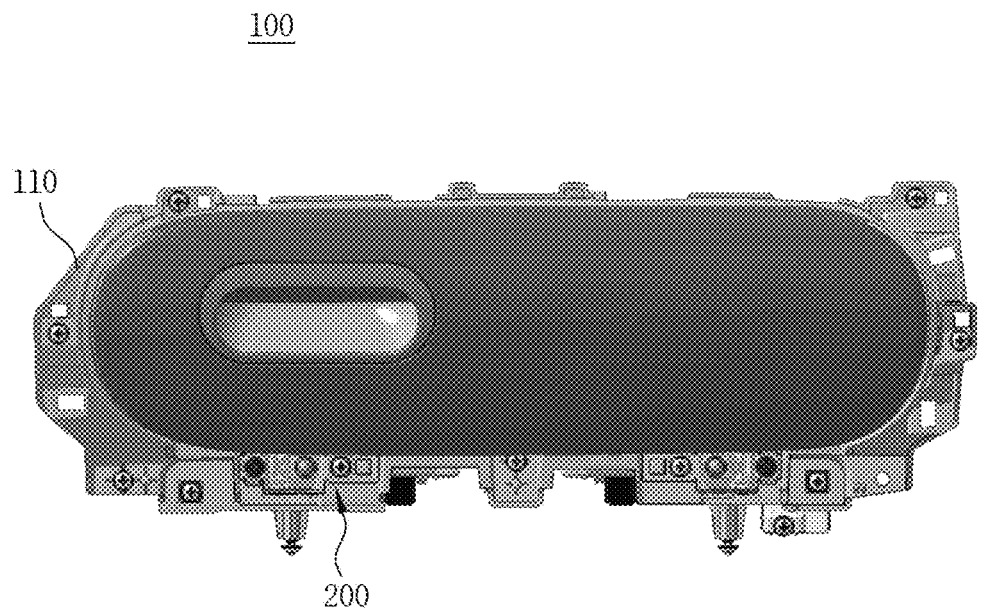

[FIG. 3]
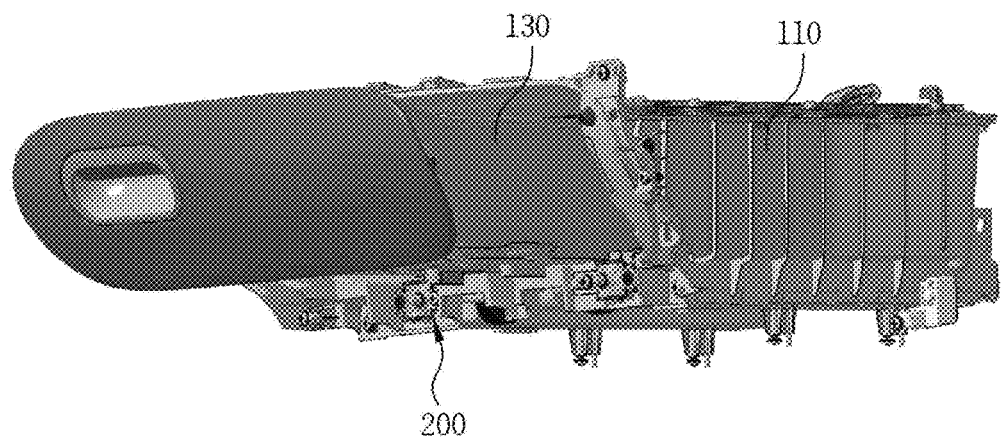
[FIG. 4]
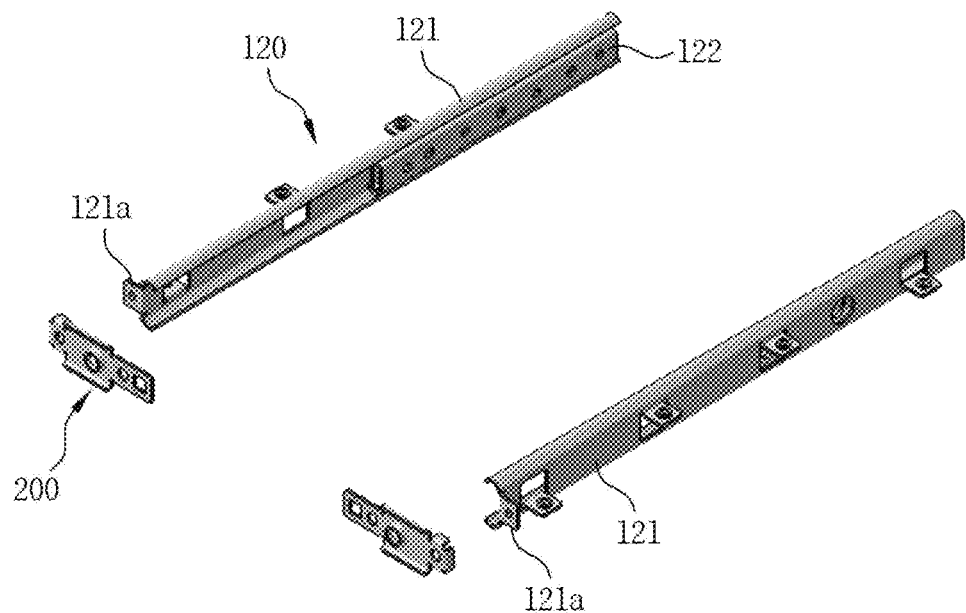

[FIG. 5]
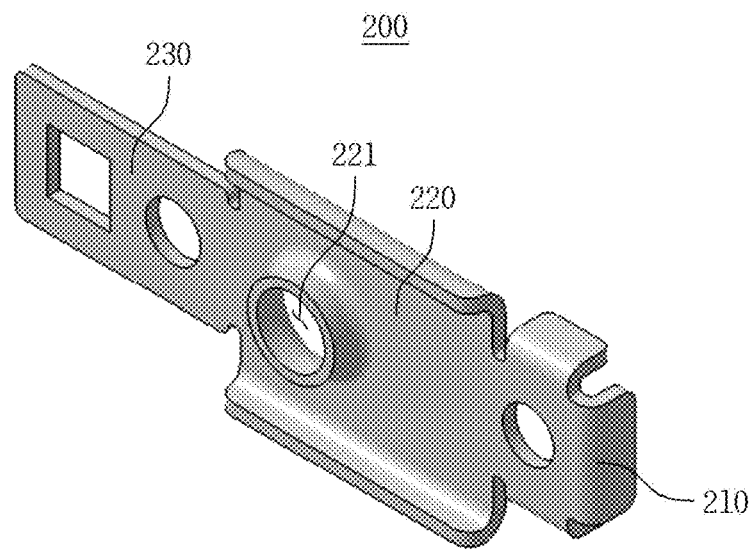
[FIG. 6]
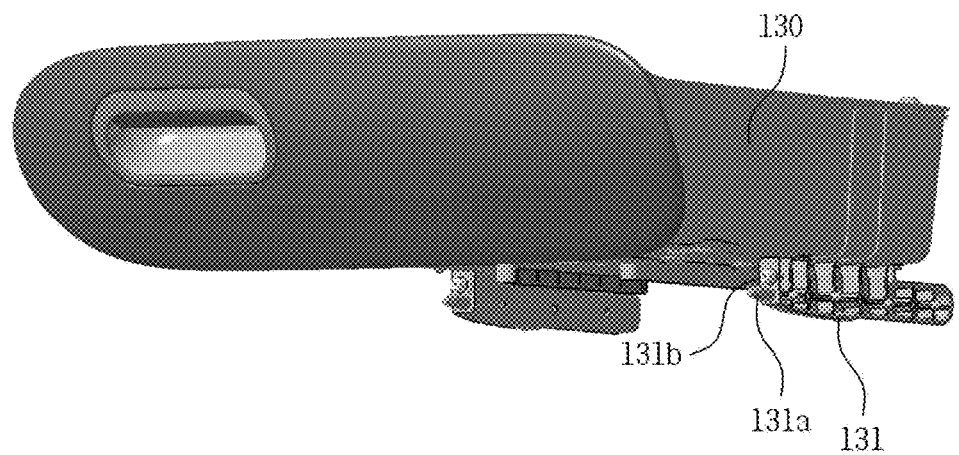

[FIG. 7]
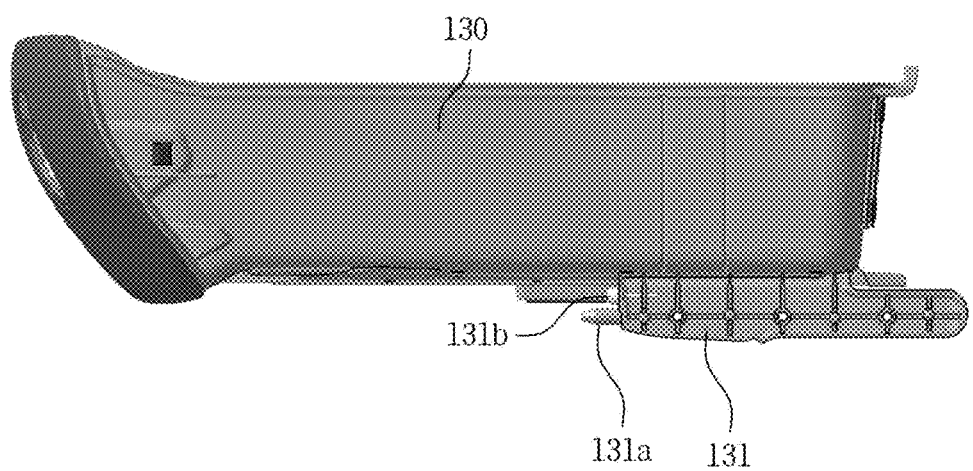
[FIG. 8]
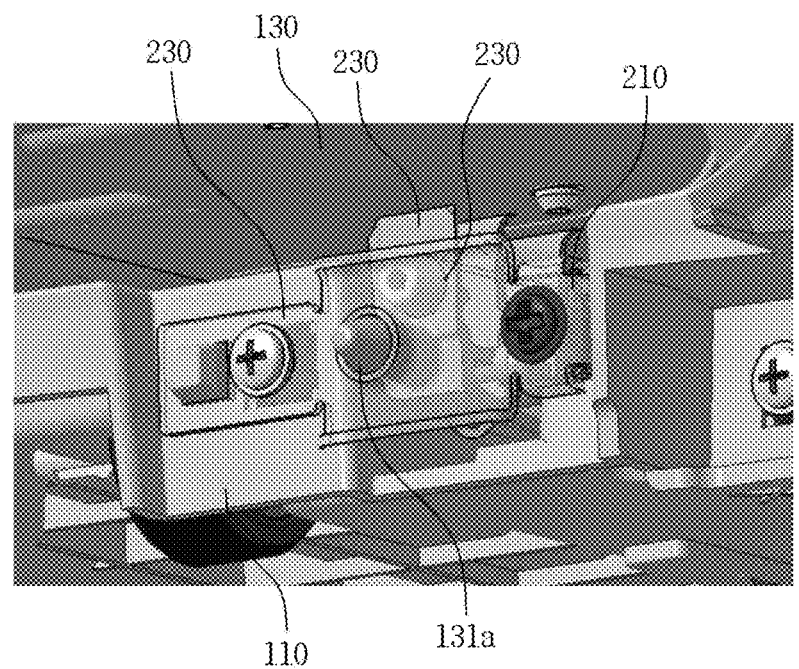

SLIDING TYPE GLOVE BOX

CROSS REFERENCE TO RELATED APPLICATION

The present application claims priority to Korean Patent Application No. 10-2020-0154663, filed Nov. 18, 2020, the entire contents of which is incorporated herein for all purposes by this reference.

BACKGROUND OF THE INVENTION

Field of the Invention

The present disclosure relates to a sliding type glove box configured such that a user can easily separate the glove box on a dashboard, the glove box being configured to minimize movement that may be generated by an external impact or vibration.

Description of the Related Art

In general, a dashboard in which an instrument device, an operation switch, an audio system, etc. are installed is provided in the front of the interior of a vehicle.

On one side of the dashboard, that is, on the passenger side of the dashboard, a glove box for storing small items used in the interior of the vehicle is installed so as to be able to be opened and closed.

The glove box may include a housing mounted to the dashboard, a storage part embedded in the housing, and a front panel mounted to a front surface of the storage part.

The storage part is configured to be opened or closed by being rotated in the housing.

Recently, as the interior space of vehicles is enlarged, a glove box that is reciprocated on the dashboard in a sliding method to be opened or closed is applied to the vehicles.

The sliding type glove box as described above is configured such that a storage part is reciprocated along guide rails on the dashboard to be opened or closed.

However, the conventional sliding type glove box has a structure in which separation of the storage part on the dashboard is difficult.

A housing mounted in the dashboard has to be separated from the dashboard first for replacement or maintenance of the storage part. However, since the housing is coupled to the dashboard by a fastening means while being disposed inside the dashboard, a work process in which the dashboard is separated from a vehicle body first is required.

However, it is very difficult for ordinary people to carry out the above work process. Therefore, there are problems in that a skilled vehicle mechanic is required and costs are incurred accordingly for replacement or maintenance.

Furthermore, the conventional sliding type glove box is configured such that guide rails are provided on opposite portions of the storage part to support the load of the storage part. Therefore, there are problems in that the internal space of the storage part is reduced by the volume occupied by the guide rails, and the guide rails are exposed to the outside of the housing when the storage part is opened, which is unsightly.

Therefore, the present applicant has developed a glove box configured to connect only a lower portion at a longitudinal one side of the storage part to the rails so that the rails are not exposed to the outside of the housing when the storage part is ejected from the housing.

As described above, the glove box in which the rails are mounted to a lower surface of the storage part may allow aesthetic of the interior space of the vehicle to be maintained. However, when the user moves the storage part from the housing in the sliding method, there is a problem in that the storage part is moved in a transversal direction thereof. Due to the structure in which the guide rails are mounted to only the lower portion of the storage part, transversal movement of the storage part during reciprocating movement thereof occurs and thus causes noise.

The present applicant has come to propose the present disclosure in order to solve the above problems, and as the document of the related prior art, Korean Patent No. 10-2082171 'Operation device of electric sliding glove box for vehicles' is published.

SUMMARY OF THE INVENTION

Accordingly, the present disclosure has been made keeping in mind the above problems occurring in the related art, and an objective of the present disclosure is to provide a sliding type glove box configured such that a storage part may be easily separated from a housing without separating the housing on a dashboard.

Another objective of the present disclosure is intended to provide a sliding type glove box configured to limit a moving distance of a storage part moved along guide rails and to prevent transversal movement of the storage part.

In order to achieve the above objective, according to one aspect of the present disclosure, there is provided a sliding type glove box including: a housing mounted to a dashboard; a plurality of rails provided inside the housing; and a storage part configured to be ejected in a sliding manner while being moved along the rails, wherein the rails may include: outer rails mounted to the housing; and inner rails configured to be movable along the outer rails and connected to a lower portion of the storage part, wherein each of the outer rails may have a stopper removably provided thereon to limit a moving distance of the storage part.

A connection piece that may be connected to the stopper may be provided on a longitudinal end of each of the outer rails, the connection piece being configured to be bent from the longitudinal end of the outer rail toward a lateral portion of the housing.

The stopper may include: a first coupling member removably coupled to the connection piece; a blocking member integrally connected to the first coupling member, and extended in a facing direction of the plurality of outer rails to block the longitudinal end of each of the outer rails; and a second coupling member integrally connected to the blocking member, and coupled to a lower-side front surface of the housing.

A connection member that may be connected to each of the inner rails may be provided on the lower portion of the storage part, and the connection member may be disposed on one portion of the lower portion of the storage part.

A fixed pin that may be inserted into a movement prevention hole formed in the blocking member may be provided on a front surface of the connection member.

The front surface of the connection member may have a buffer member that may be brought into contact with a rear surface of the blocking member when the storage part may be moved in the sliding manner and exposed out of the housing.

According to the present disclosure, the sliding type glove box is configured such that the user can easily separate the storage part from the housing. Therefore, the user can easily carry out a process of replacement or maintenance of the storage part.

The sliding type glove box according to the present disclosure is also configured to prevent the storage part in an opened state from being moved due to an external impact or shaking the storage part. Therefore, deformation or damages of the glove box can be reduced.

The sliding type glove box according to the present disclosure is also configured such that the guide rails ejecting the storage part are not exposed to the outside of the housing even when the storage part is opened while being exposed out of the housing. Therefore, appearance of the interior space of the vehicle can be kept beautiful without deterioration thereof.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a perspective view showing a sliding type glove box according to an embodiment of the present disclosure.

FIG. 2 is a front view showing the sliding type glove box shown in FIG.1.

FIG. 3 is a perspective view showing a storage part in an ejected state from a housing according to the embodiment of the present disclosure.

FIG. 4 is a perspective view showing a structure of rails and stoppers according to the embodiment of the present disclosure.

FIG. 5 is a perspective view showing a structure of each stopper shown in FIG. 4.

FIG. 6 is a perspective view showing the storage part according to the embodiment of the present disclosure.

FIG. 7 is a side view showing the storage part shown in FIG. 6.

FIG. 8 is an enlarged-perspective view showing area A shown in FIG. 3.

DETAILED DESCRIPTION OF THE INVENTION

Features and advantages of the present disclosure and an achieving method therefor will be more clearly understood from the embodiments, as will be described in detail hereinafter, in conjunction with the accompanying drawings.

However, the present disclosure is not limited to the embodiments disclosed below, but may be implemented in various different forms. The embodiments are provided to make the present disclosure complete, and are provided to fully inform one of ordinary skill in the art to which the present disclosure belongs, and the scope of the present disclosure is defined by the accompanying claims.

Hereinafter, a sliding type glove box according to an embodiment of the present disclosure will be described with reference to FIGS. 1 to 8. In the following description, when the functions of conventional elements and the detailed description of elements related with the present disclosure may make the gist of the present disclosure unclear, a detailed description of those elements will be omitted.

FIG. 1 is a perspective view showing a sliding type glove box according to an embodiment of the present disclosure. FIG. 2 is a front view showing the sliding type glove box shown in FIG.1. FIG. 3 is a perspective view showing a storage part in an ejected state from a housing according to the embodiment of the present disclosure. FIG. 4 is a perspective view showing a structure of rails and stoppers according to the embodiment of the present disclosure. FIG. 5 is a perspective view showing a structure of each stopper shown in FIG. 4. FIG. 6 is a perspective view showing the storage part according to the embodiment of the present disclosure. FIG. 7 is a side view showing the storage part shown in FIG. 6. FIG. 8 is an enlarged-perspective view showing area A shown in FIG. 3.

As shown in FIGS. 1 to 8, the sliding type glove box 100 according to the embodiment of the present disclosure includes:

A housing 110 mounted to a dashboard (not shown); a pair of rails 120 provided inside the housing 110; a storage part 130 configured to be able to be ejected in a sliding manner while being moved along the rails 120.

As described above, the housing 110 is a component mounted to the dashboard. The housing 110 has a space that may accommodate the storage part 130 therein.

The rails 120 may be provided at the space provided inside the housing 110.

As shown in FIG. 4, the rails 120 may include: outer rails 121 mounted to the housing 110; and inner rails 122 configured to be movable along the outer rails and connected to a lower portion of the storage part 130.

The pair of outer rails 121 mounted to the housing 110 may be disposed while being spaced apart from each other at a predetermined distance. For example, the outer rails 121 according to the embodiment of the present disclosure is shown in the drawing as having a '⊏'-shape.

Each of the inner rails 122 may be provided in a groove portion formed in each of the outer rails 121 with having a length shorter than a length of the outer rails 121.

As described above, the inner rails 122 may be moved in a longitudinal direction of the outer rail 121 while being connected to the lower portion of the storage part 130.

Therefore, when the inner rails 122 are moved along the longitudinal direction of the outer rail 121, the storage part 130 may be moved in the sliding manner. As shown in FIGS. 1 to 5, the outer rails 121 may include stoppers 200 that limit a moving distance of the storage part 130.

The stoppers 200 may be provided on connection pieces 121a provided on a longitudinal end of each of the outer rails 121. For example, the connection pieces 121a may be integrally formed with the outer rails 121, and each of the connection pieces 121a may be bent toward an inner lateral portion of the housing 110.

Each of the stoppers 200 includes: a first coupling member 210 removably coupled to the connection piece 121a; a blocking member 220 integrally coupled to the first coupling member 210 and extended in a facing direction of the pair of the outer rails 121 to block the longitudinal end of the outer rail 121; and a second coupling member 230 integrally connected to the blocking member 220 and coupled to a lower-side front surface of the housing.

The first coupling member 210 may be coupled to the connection piece 121a by using a known fastening means such as a bolt, a nut, and a screw. Therefore, both the first coupling member 210 and the connection piece 121a have fastening holes into which the fastening means may be inserted.

For example, in order for the user to easily couple the first coupling member 210 of the stopper 200 to the connection piece 121a and to separate the storage part 130 from the housing 110, it is preferable that the connection piece 121a is formed to be bent from the longitudinal end of the outer rail 121 toward the inner lateral portion of the housing 110 as described above. In other words, in order for the user to easily perform a fastening work between the connection pieces 121a and the first coupling member 210 at the outside of the outer rails 121, it is preferable that the connection pieces 121a are exposed to the outside of the outer rails. In order for the user to fully remove the storage part 130 from the housing 110 for replacement or maintenance of the storage part 130, it is preferable that the connection pieces 121a are formed on positions that do not interfere with the movement of the inner rails 122.

For example, when the connection pieces 121a are formed to be bent in the facing direction of the pair of outer rails 121, the operator should perform a bolting work of the first coupling member 210 and the connection pieces 121a with difficulty. Because the connection pieces 121a is not exposed to the naked eyes of the operator. In addition, when the connection piece 121a is formed to be bent from the longitudinal end of the outer rail 121 in the facing direction of the pair of outer rails 121, the inner rail 122 is prevented from being separated through the longitudinal end of the outer rail 121, whereby the operator cannot separate the storage part 130 from the housing 110.

Therefore, it is preferable that the connection piece 121a may be formed to be bent from the longitudinal end of the outer rail 121 in the direction opposite to the facing direction of the pair of outer rails 121, that is, to be bent toward the lateral portion of the housing 110.

The blocking member 220 serves to prevent the inner rail 122 from being separated from the groove portion of the outer rail 121, when the inner rail 122 is moved from a longitudinal second side to a longitudinal first side of the outer rail 121 for opening the storage part 130.

In other words, the blocking member 220 serves to prevent the inner rail 122 from being separated from the outer rail 121, when the storage part 130 is ejected from the housing 110 and fully opened as shown in FIGS. 3 and 8.

The second coupling member 230 serves to reinforce a supporting force of the blocking member 220 by being coupled to a lower portion of the housing 110, as shown in FIGS. 3 and 8. The second coupling member 230 may be coupled to a front surface of the lower portion of the housing 110 by a fastening means. Accordingly, the second coupling member 230 and the lower side front surface of the housing 110 have fastening holes, respectively, and the fastening means such as a bolt or a screw may be inserted into the fastening holes.

The stopper 200 configured as described above may be separated from the longitudinal ends of the outer rail 121 by a releasing word of the fastening means, when the user needs to separate the storage part from the housing 110 for replacement or maintenance of the storage part 130.

As shown in FIGS. 6 and 7, the storage part 130 may include a connection member 131 connected to the inner rail 122. The connection member 131 may be formed in a bar shape and a pair of connection members 131 may be provided on one side of the lower portion of the storage part 130 at a distance therebetween.

When the inner rail 122 is moved toward the longitudinal end of the outer rail 121 for the storage part 130 to be opened from the housing 110, as shown in FIG. 3, while only a portion where the connection member 131 is not disposed is exposed to the outside of the housing 110, the storage part 130 may be opened. By the arrangement structure between the connection member 131 and the inner rail 122, the rails may not be exposed to the outside of the housing, even when the storage part 130 is exposed to the outside of the housing 110.

As shown in FIGS. 6 and 8, on a front surface of the connection member 131 may include a fixed pin 131a that is inserted into the movement prevention hole 221 formed in the blocking member 220.

When the storage part 130 is opened, the fixed pin 131a and the movement prevention hole 221 formed in the blocking member 220 serve to prevent the storage part 130 from being moved due to an external impact or shaking.

When the inner rail 122 is moved toward the longitudinal end of the outer rail 121 for fully opening the storage part 130, the longitudinal end of the inner rail 122 is brought into contact with a rear surface of the blocking member 220 of the stopper 200. Then, the fixed pin 131a formed on the front surface of the connection member 131 may be inserted into the movement prevention hole 221 formed on the blocking member 220 so that the storage part 130 is not moved in a transversal direction thereof.

As shown in FIG. 8, when the fixed pin 131a is inserted in the movement prevention hole 221 of the blocking member 220, the storage part 130 remaining in the opening state may be prevented from being moved in the transversal direction thereof.

In other words, the blocking member 220 of the stopper 200 serves to prevent the storage part 130 remaining in the opening state from being moved forward in a longitudinal direction of the first end, and the movement prevention hole 221 formed on the blocking member 220 and the fixed pin 131a formed on the connection member 131 prevents the storage part 130 in the opening state from being moved in the transversal direction.

Therefore, the stopper 200 according to the embodiment of the present disclosure limits a longitudinal direction of the storage part 130 and prevents the storage part 130 from being moved in the transversal direction when the storage part 130 is moved and opened from the housing 110.

The front surface of the connection member 131 may have an buffer member 131b that is brought into contact with the rear surface of the blocking member 220 when the storage part 130 is moved in the sliding manner to be exposed to the outside of the housing 110.

The buffer member 131b may be provided on the front surface of the connection member 131 while being located above a position in which the fixed pin 131a is formed. The buffer member 131b may have a protruding length that is in contact with the rear surface of the blocking member 220, when the fixed pin 131a is inserted into the movement prevention hole 221.

The buffer member 131b may be manufactured of material having elasticity, such as a rubber material, silicone, a synthetic resin material.

Therefore, when the storage part 130 is opened, as a force transmitted to the blocking member 220 of the stopper 200 is relaxed, the deformation or the damages of the blocking member 220 can be reduced.

Although the detailed embodiment of the present disclosure has been described for illustrative purposes, those skilled in the art will appreciate that various modifications, additions, and substitutions are possible, without departing from the scope and spirit of the present disclosure.

Accordingly, the present disclosure is intended to cover not only the above-described embodiment, but also various alternatives, modifications, equivalents and other embodiments that may be included within the spirit and scope of the present disclosure as defined by the appended claims.

What is claimed is:
1. A sliding type glove box comprising:
a housing mounted to a dashboard;

a plurality of rails provided inside the housing; and
a storage part configured to be ejected in a sliding manner while being moved along the rails,
wherein the rails comprise:
outer rails mounted to the housing; and
inner rails configured to be movable along the outer rails and connected to a lower portion of the storage part,
wherein each of the outer rails has a stopper removably provided thereon to limit a moving distance of the storage part, and
wherein a connection piece that is connected to the stopper is provided on a longitudinal end of each of the outer rails, the connection piece being configured to be bent from the longitudinal end of the outer rail toward a lateral portion of the housing.

2. The sliding type glove box of claim 1, wherein the stopper comprises:
 a first coupling member removably coupled to the connection piece;
 a blocking member integrally connected to the first coupling member, and extended in a facing direction of the plurality of outer rails to block the longitudinal end of each of the outer rails; and
 a second coupling member integrally connected to the blocking member, and coupled to a lower-side front surface of the housing.

3. The sliding type glove box of claim 2, wherein a connection member that is connected to each of the inner rails is provided on the lower portion of the storage part, and
 the connection member is disposed on one portion of the lower portion of the storage part.

4. The sliding type glove box of claim 3, wherein a fixed pin that is inserted into a movement prevention hole formed in the blocking member is provided on a front surface of the connection member.

5. The sliding type glove box of claim 4, wherein the front surface of the connection member has a buffer member that is brought into contact with a rear surface of the blocking member when the storage part is moved in the sliding manner and exposed out of the housing.

\* \* \* \* \*